United States Patent [19]

Michel et al.

[11] Patent Number: 4,988,864
[45] Date of Patent: Jan. 29, 1991

[54] PHOTOELECTRIC ANGLE MEASURING DEVICE WITH ADJACENT ORDER INTERFERENCE

[75] Inventors: Dieter Michel; Walter Huber, both of Traunstein, Fed. Rep. of Germany

[73] Assignee: Dr. Johannes Heidenhain GmbH, Traunreut, Fed. Rep. of Germany

[21] Appl. No.: 466,466

[22] Filed: Jan. 17, 1990

[30] Foreign Application Priority Data

Jan. 20, 1989 [DE] Fed. Rep. of Germany ....... 3901534

[51] Int. Cl.$^5$ .................. G01D 5/34; G01B 11/02
[52] U.S. Cl. .................... 250/231.16; 250/237 G; 356/356
[58] Field of Search ............ 250/231.14, 231.16, 250/237 G; 356/373, 374, 356, 358; 33/707; 341/11, 13

[56] References Cited

U.S. PATENT DOCUMENTS

| 3,891,321 | 6/1975 | Hock | 356/356 |
| 4,265,542 | 5/1981 | Snow | 356/356 |
| 4,629,886 | 12/1986 | Akiyama et al. | 250/231.16 |
| 4,792,678 | 12/1988 | Spies | 250/231.16 |
| 4,815,850 | 3/1989 | Kanayama et al. | 356/356 |
| 4,868,385 | 9/1989 | Nishimura et al. | 250/231.16 |
| 4,938,595 | 7/1990 | Parriaux et al. | 250/237 G |

FOREIGN PATENT DOCUMENTS

| 2237032 | 3/1973 | Fed. Rep. of Germany | 250/231.16 |
| 1269260 | 11/1986 | U.S.S.R. | 250/231.16 |

Primary Examiner—David C. Nelms
Assistant Examiner—Michael Messinger
Attorney, Agent, or Firm—Willian Brinks Olds Hofer Gilson & Lione

[57] ABSTRACT

A photoelectric measuring device for measuring the position of two objects which can be rotated relative to each other. The measuring device includes a grid graduation located on a graduation support to which the first object can be attached. The second object is attached to a scanning unit scan that scans the grid by means of light diffraction. A beam from the light source is diffracted into partial beam bundles in a first graduation zone of the grid graduation and brought into interference in a second graduation zone which is diametrically opposite of the first graduation zone on the grid graduation for measurement. In order to eliminate or compensate for eccentricity and to produce signals that are phase-displaced and interfere with sinusoidal intensity changes between interference fringes, only partial beam bundles of adjacent orders of diffraction are brought into interference in the second graduation zone.

14 Claims, 3 Drawing Sheets

PHOTOELECTRIC ANGLE MEASURING DEVICE WITH ADJACENT ORDER INTERFERENCE

BACKGROUND OF THE INVENTION

This invention relates generally to a position measuring device and particularly, to a photoelectric angle measuring device for measuring the angular position of two relatively rotatable objects.

Such position measuring devices are used, for example, in processing machines for measuring the relative position between a tool and workpiece. Typically, a scanning unit connected to the tool scans a graduation plate connected to the workpiece. The signal obtained as a result of scanning is used to determine the angular position of the tool with respect to the workpiece.

A previous device directed at measuring the position of two relatively rotatable objects is disclosed in U.S. Pat. No. 4,792,678 for "Photoelectric Angle Measuring Device" by Alfons Spies, issued Dec. 20, 1988, assigned to the assignee of the present invention, and incorporated herein by reference. The '678 patent discloses an invention for angle measuring in which the eccentricity error is compensated by diametrical scanning of a grid graduation. The '678 invention includes a scanning unit to which one of the objects is attached and a rotatable graduation support to which the other object is attached. In one of the embodiments of '678 invention, two linear graduations (G1a and G2a in FIG. 3) are used for the deflection of the positive and negative diffraction beams. In this embodiment of the '678 invention, the scanning unit is comprised of a light source, the two linear grids, and a photoelement. The graduation support may be a graduation cylinder or a graduation plate. The graduation support includes a grid graduation having first and second graduation zones. A beam of light from the light source is diffracted by the first graduation zone resulting in beams of a positive and negative first orders of diffraction. These beams are then directed through the two linear grids and brought into interference at the second graduation zone which is located diametrically opposite the first graduation zone on the grid graduation. The photoelement then measures the combined interfering beams and produces a signal that can be appropriately processed. Evaluation of the interference of the beams of the positive and negative first orders of diffraction can made to compensate for eccentricity error.

The present invention is directed to an improved position measuring device which provides high resolution angular measurement.

Accordingly, it is an object of the present invention to create a simply constructed angle measuring device in which the evaluation of interfering diffraction beams leads to phase-displaced signals having a high degree of modulation.

It is another object of the invention to provide a device of relatively simple construction that produce pinpointedly phase-displaced signals.

SUMMARY OF THE INVENTION

The present invention provides a photoelectric measuring device for measuring the position of two objects which can be rotated relative to each other. The photoelectric measuring device includes a grid graduation located on a graduation support to which the first object can be attached. The second object is attached to a scanning unit that scans the grid graduation by means of light diffraction. A beam from the light source is diffracted into partial beam bundles in a first graduation zone of the grid graduation and brought into interference in a second graduation zone of the grid graduation which is diametrically opposite from the first graduation zone whereupon the resulting interfering signals can be measured for evaluation. In order to eliminate or compensate for eccentricity and to produce signals that are phase-displaced and interfere with sinusoidal intensity changes between interference fringes, only partial beam bundles of adjacent orders of diffraction are brought into interference in the second graduation zone.

DETAILED DESCRIPTION OF THE PRESENTLY PREFERRED EMBODIMENTS

Figure 1:
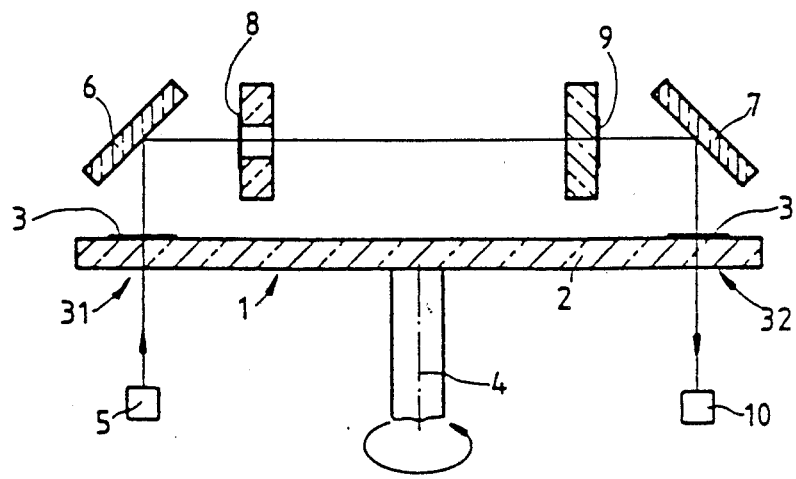
FIG. 1 is a schematic depiction of a side view of one embodiment of the present invention.

Referring to FIG. 1, there is a schematic depiction of an embodiment of the present invention for an angle measuring apparatus 1 for measuring the position of two objects that can be rotated relative to each other. A rotatable graduation support 2 is connected to one of the objects (not shown). The graduation support 2 includes a circular grid graduation 3. The graduation support 2 (and the object connected thereto) rotates about an axis rotation 4. The other of the objects (also not shown) is connected to a scanning unit that is part of the angle measuring apparatus. Typically, the object connected to the scanning unit is a stationary object such as a tool and the object connected to the graduation support is a workpiece.

The scanning unit includes a light source which may be a laser 5. The laser 5 is adapted and positioned to illuminate the circular grid graudation 3 with a light beam at a first grid scanning zone 31. This light beam is diffracted by the circular grid graduation 3 into partial beam bundles. The scanning unit further includes deflecting mirrors 6 and 7 which deflect the partial beam bundles diffracted by the circular graduation 3 to the diametrically opposite side of the graduation carrier 2 onto a second grid scanning zone 32 where they interfere. Accordingly, the beam from the laser 5 scans the grid graduation 3 in two grid scanning zones 31 and 32 that are diametrically opposite each other. Positioned with respect to the second grid scanning zone 32 are one or more photodetectors 10 which detect the interference fringes.

In the beam course between the two grid scanning zones 31 and 32, are first and second linear grids 8 and 9. The first and second linear grids 8 and 9 serve to diffract the beams. In the present invention, the grid graduation, and the first and linear grids have grid parameters and are con so that only beam bundles having adjacent order diffraction are brought into interference.

This interference between two beam bundles with adjacent orders of diffraction is characterized by sinusoidal intensity change between two interference fringes. Further description pertaining to this character is set forth below in reference to FIGS. 4, 5 and 6.

Figure 2:
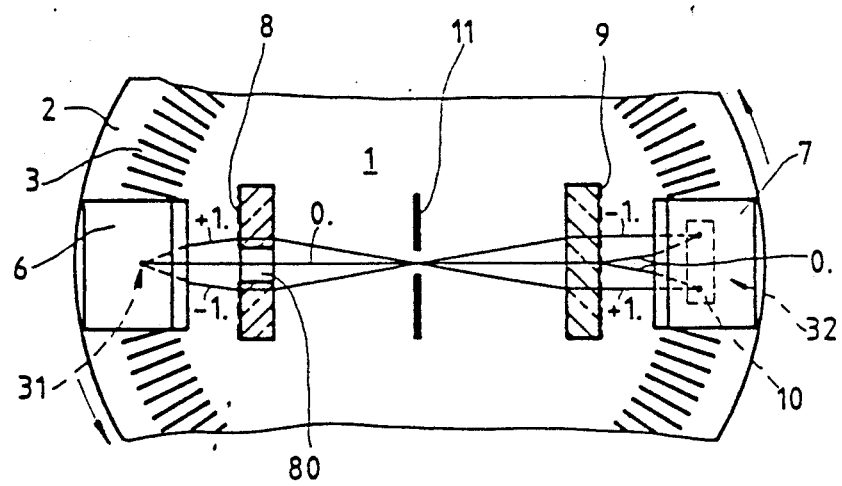
FIG. 2 is a schematic depiction of a partial top view of the embodiment depicted in FIG. 1.

FIG. 2 shows the paths of the diffracted beam bundles of +1st and −1st order (marked "+1." and "−1.", respectively) on the linear grids 8 and 9. The first linear grid 8 includes a diffraction-optically neutral zone 80, through which the 0th (zero) order beam (marked "0.") passes uninfluenced. The second linear grid 9 does not include an optically neutral zone in the path of the zero order beam. Accordingly, when the second linear grid 9 diffracts the zero order beam, the zero order beam is brought into interference with the +1st and −1st order beams at the scanning zone 32 on the grid graduation 3 of carrier 2. As depicted in FIG. 2, the zero order "0." and the +1st positive first order beam "+1." brought into interference and the zero order beam "0." and the −1st negative first order beam "−1." are into interference in the second scanning zone 32. Accordingly, only partial beam bundles of adjacent orders of diffraction interfere, such as −1th and 0th, or 0th and +1st. The intensity changes between the two interference fringes are detected by photodetectors 10 and processed by an electronic system (not shown).

This embodiment of the invention may also include a blind 11 positioned between the first linear grid 8 and the second linear grid 9 to screen out partial beam bundles of undesired orders of diffraction. In this embodiment, the blind 11 has an opening therein and is positioned with with respect to the first linear grid 8 and the second linear grid 9 so that the opening coincides with the paths of the beams of the +1st, 0th, and −1st orders of diffraction.

Figure 3:
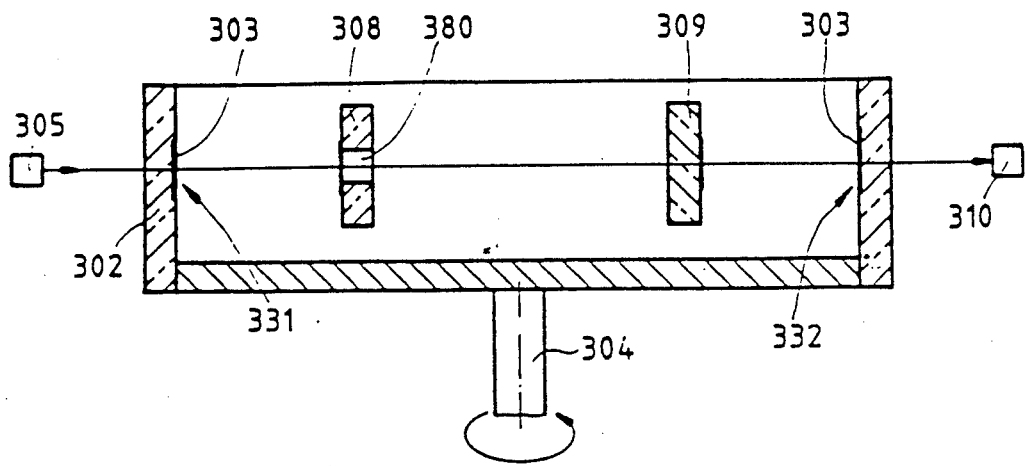
FIG. 3 is a schematic depiction of a side view of another embodiment of the invention.
Figure 4:
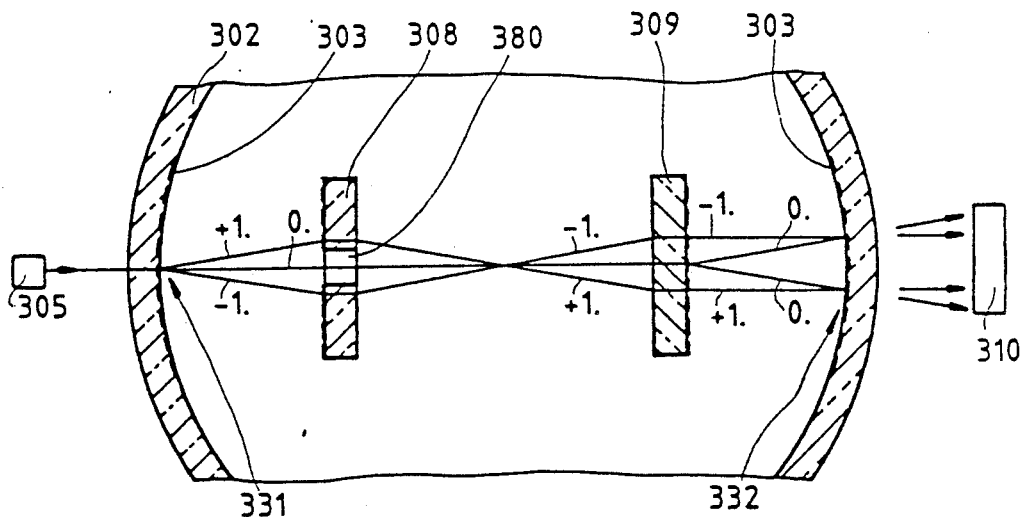
FIG. 4 is a schematic depiction of a partial top view of the embodiment depicted in FIG. 3.

FIGS. 3 and 4 show another embodiment of the invention. In this embodiment, a transparent hollow cylinder 302 is turnable about an axis of rotation 304. On the cylinder 302 is located an angle graduation 303. As in the previous embodiment, a light source, such as a laser 305, emits a light beam that is diffracted on the angle graduation 303 in a first grid scanning zone 331. Partial beam bundles of the +1st and −1st order (marked "+1." and "−1.", respectively) are diffracted by both a first linear grid 308 and second linear grid 309 causing them to impinge in two distinct areas of a second grid scanning zone 332 which is diametrically oppositely the first grid scanning zone 331. As in the previous embodiment, the first linear grid 308 includes a zone 308 which is a diffraction optically neutral, i.e., which does not diffract the zero order beam but allows it to pass without diffraction. Accordingly, only the partial beam bundles of the adjacent orders of diffraction −1st/0th and 0th/+1st interfere. As in the previous embodiment, the intensity changes between two interference fringes are measured by photodetectors 310 and processed by an electronic system (not shown).

Figure 5:
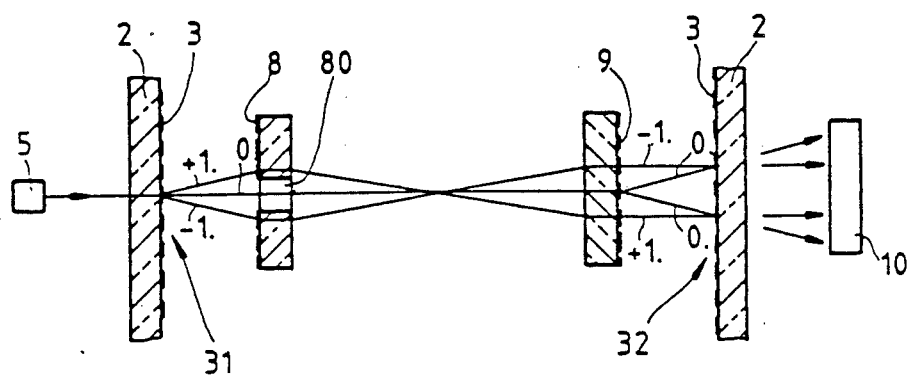
FIG. 5 is a schematic depiction of the developed beam course in the present invention.

FIG. 5 is a schematic of a developed beam course which corresponds to the embodiment depicted in FIGS. 1–4. (The deflection mirrors 6 and 7 shown in FIG. 1 are not represented since they are do not affect the diffraction of the beam). A light beam emitted from the laser 5 is diffracted by "the grid graduation 3 of the carrier 2. The partial beam bundles of the positive and negative first orders of diffraction (marked "+1." and "−1.", respectively) are diffracted by the grid graduation 3 and impinge upon the first linear grid 8. The grid structure of the first linear grid 8 is chosen so that on it the positive and negative first order of diffraction ("+1." and "−1.", respectively) are diffracted and impinge upon the second linear grid 9. On the second linear grid 9, the positive and negative first are again diffracted.

The grid constants of the second linear grid 9 deviate from the grid constants of the first linear grid 8. Moreover, the grid constants of the second linear grid 9 also deviate among one another depending upon the order of diffraction. The grid area on the second linear grid 9 for the zero order of diffraction has the same grid constant as the grid graduation 3. The grid constants for the grid areas for the positive and negative first orders of diffraction both from the grid constant of the grid graduation 3 and also from the grid constant of the first linear grid 8.

The zero order of diffraction, which passes through the first linear grid 8 in a diffraction-optically neutral zone 80 is diffracted by the second linear grid 9 and comes into interference with its adjacent orders of diffraction on the second grid scanning zone 32 of the grid graduation 3. Thus the grid graduation 3 is scanned twice (once on each of the diametrically oppositely grid scanning zones 31 and 32) which leads to the elimination of the eccentricity error.

Figure 6:
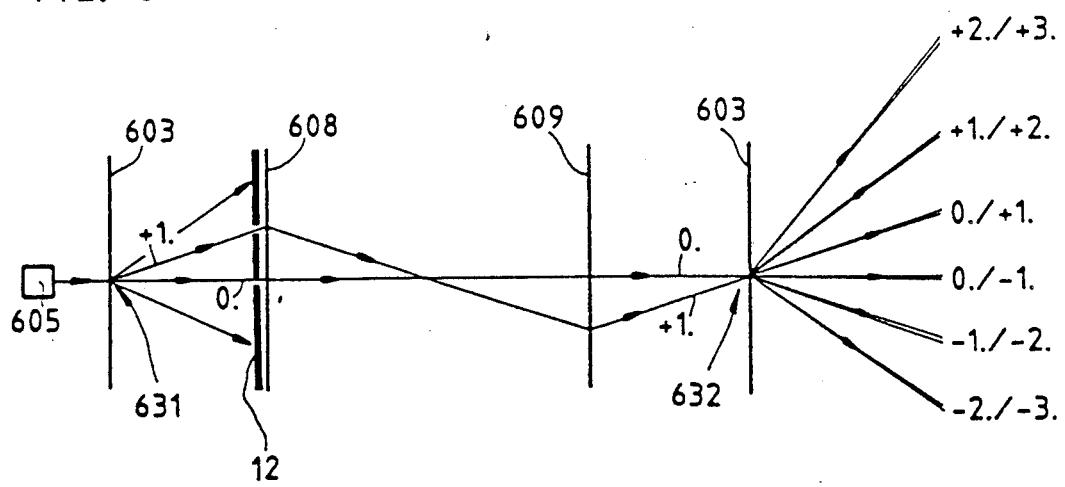
FIG. 6 is a schematic depiction of another embodiment of the invention.

In FIG. 6, there is a schematic representation of another embodiment of the present invention. As in the previous embodiments, a light source 605 emits a beam which is diffracted by a first grid scanning zone 631 of the circular graduation 603 and is remixed in the second grid scanning zone 632 which is exactly diametrally opposite the first scanning zone 631. With the aid of photoelements (not shown), the signals are recovered by interference of adjacent orders of diffraction.

In this embodiment, undesired orders of diffraction are screened out by a blind 12 and only orders of diffraction that will produce interference between adjacent orders (e.g., "+1." and "0.") are allowed to pass. In this embodiment, the first and second linear grids 608 and 609 may have identical grid parameters. The detected signals are phase-shifted to one another. For example, by evaluating of the interfering partial beam bundles of −1st/−2nd, 0th/−1st, 0th/+1st, +1st/−2nd orders, there are generated signals that are phase-shifted to one another in each case by about 90 degrees with a very good degree of modulation.

In each of the embodiments described above, the linear grids can be constructed as holographic optical elements (HOE), which are produced as computer-generated holograms.

If a light source with low coherence length is used, then the substrate of the grids is formed in such a way that optically equal-length paths are yielded for the partial beam bundles of different orders of diffraction.

The invention is not restricted to the use in transmitted-light measuring systems, but is usable also in incident-light measuring systems.

In the device disclosed in the U S. Pat. No. 4,792,678, as described above, the positive and the negative partial beam bundles of one order of diffraction are brought into interference. The present invention differs from the device of '678 in that beams of adjacent order of diffraction are brought into interference thereby providing the characteristic sinusoidal intensity change.

It is therefore intended that the foregoing detailed description be regarded as illustrative rather than limiting and that it be understood that it is the following claims, including all equivalents, which are intended to define the scope of the invention.

I claim:

1. A photoelectric measuring device for measuring the position of a first object rotatably movable with respect to a second object comprising:
   a graduation support to which the first object can be connected, said graduation su having a grid graduation, and further in which said graduation comprises a first graduation zone second graduation zone diametrically opposite to first graduation zone,
   a scanning unit to which the second object can be connected, said scanning unit positioned to scan with a beam of light said first graduation zone to direct partial beam bundles into interference on said second graduation zone,
   a photodetector positioned to measure interfering partial beam bundles on said second graduation zone, and
   diffraction grids in the beam path between said first graduation zone and said second graduation zone, said diffraction grids and said grid graduation positioned and having grid parameters so partial beam bundles of adjacent orders of diffraction are brought into interference on said second graduation zone.

2. The photoelectric measuring device of claim 1 in which said diffraction grids further comprise:
   a first linear grid having an optically neutral portion aligned with said grid graduation so that the 0th order of diffraction of a beam passes through said optically neutral portion, and
   a second linear grid positioned with respect to said first linear grid and said second graduation zone to bring into interference in said second graduation zone partial beam bundles of adjacent orders of diffraction.

3. The photoelectric measuring device of claim 2 in which said second linear grid comprises:
   a first grid area located with respect to said first linear grid to diffract the beam of 0th order of diffraction, said first grid area having a grid constant equal to the grid constant of said graduation,
   a second grid area located with respect to said first linear grid to diffract the beams of positive and negative first orders of diffraction, said second grid area having a grid constant different than that of the grid constant of said first grid area and different than that of the grid constant of said first linear grid.

4. The photoelectric measuring device of claim 3 further comprising:
   a blind positioned between said first linear grid and said second linear grid to screen out partial beam bundles of undesired orders of diffraction.

5. The photoelectric measuring device of claim 1 further comprising:
   a first linear grid positioned to diffract partial beam bundles from said first graduation zone,
   a blind positioned with respect to said first graduation zone to transmit only partial beam bundles of adjacent order of diffraction to said first linear grid, and
   a second linear grid positioned with respect to said first linear grid and said second graduation zone to bring into interference in said graduation zone partial beam bundles of orders of diffraction from said first linear grid.

6. The photoelectric measuring device of claim 5 in which the grid constant of said first linear grid is equal to the grid constant of said second linear grid.

7. The photoelectric measuring device of claim 1 in which said diffraction grids are holographic optical elements.

8. In a photoelectric measuring device for measuring the position of a first object rotatably movable with respect to a second object comprising a graduation support to which the first object can be connected, a grid graduation located on the graduation support, a scanning unit to which the second object can be connected, the scanning unit positioned to scan the grid graduation by means of a light beam, a first graduation zone of the grid graduation adapted to emit, when scanned by the scanning unit, light beams of multiple diffraction orders, a second zone of the grid graduation diametrically opposed to the first graduation zone, an improvement comprising:
   diffraction grids positioned in beam path between the first graduation zone and the second graduation zone, said diffraction grids and the grid graduation positioned and having grid parameters so that partial beam bundles of adjacent orders of diffraction are brought into interference on the second graduation zone.

9. The photoelectric measuring device of claim 8 in which said diffraction grids comprise:
   a first linear grid having an optically neutral portion aligned with the grid graduation so that the 0th order of diffraction of a beam passes through the optically neutral portion, and
   a second linear grid positioned with respect to said first linear grid and the second graduation zone to bring into interference in the second graduation zone partial beam bundles of adjacent orders of diffraction.

10. The photoelectric measuring device of claim 9 in which said second linear grid comprises:
    a first grid area located with respect to said first linear grid to refract the beam of 0th order of diffraction, said first grid area having a grid constant equal to the grid constant of the grid graduation,
    a second grid area located with respect to said first linear grid to refract the beams of first and second order diffraction, said second grid area having a grid constant different than that of the grid constant of said first grid area and different than that of the grid constant of said first linear grid.

11. The photoelectric measuring device of claim 10 further comprising:
    a blind positioned between said first linear grid and said second linear grid to screen out partial beam bundles of undesired orders of diffraction.

12. The photoelectric measuring device of claim 8 in which said diffraction grids comprises:
    a first linear grid positioned to diffract partial beam bundles from the first graduation zone,
    a second linear grid positioned with respect to said first linear grid and the second graduation zone to bring into interference in the second graduation zone partial beam bundles of orders of diffraction from said first linear grid, and in which the photoelectric measuring device also further comprises:
    a blind positioned with respect to the first graduation zone to transmit only partial beam bundles of adjacent order of diffraction to said first linear grid.

13. The photoelectric measuring device of claim 12 in which the grid constant of said first linear grid is equal to the grid constant of said second linear grid.

14. The photoelectric measuring device of claim 8 in which said diffraction grids are comprised of a holographic optical element.

* * * * *

UNITED STATES PATENT AND TRADEMARK OFFICE
CERTIFICATE OF CORRECTION

PATENT NO. : 4,988,864

DATED : January 29, 1991

INVENTOR(S) : Dieter Michel et al.

It is certified that error appears in the above-identified patent and that said Letters Patent is hereby corrected as shown below:

IN THE DETAILED DESCRIPTIONS OF THE
PRESENTLY PREFERRED EMBODIMENTS

In column 2, line 48, please delete "graudation" and substitute therefor --graduation--.

In column 2, line 66, before "linear" please insert --second--.

In column 2, line 67, please delete "con" and substitute therefor --configured--.

In column 3, line 4, please delete "character" and substitute therefor --characteristic--.

In column 3, line 16, before "scanning" please insert --second--.

In column 3, line 18, before "brought" please insert --are--.

In column 3, line 20, before "into" please insert --brought--.

In column 3, line 32, please delete the first occurrence of "with".

In column 3, line 50, please delete "308" and substitute therefor --380--.

UNITED STATES PATENT AND TRADEMARK OFFICE
CERTIFICATE OF CORRECTION

PATENT NO. : 4,988,864

DATED : January 29, 1991

INVENTOR(S) : Dieter Michel et al.

It is certified that error appears in the above-identified patent and that said Letters Patent is hereby corrected as shown below:

In column 3, line 61, before "do" please delete --are--.

In column 3, line 63, before the second occurrence of "the" please delete the quotation mark.

In column 4, line 4, before "are" please insert --orders--.

In column 4, line 14, before "both" please insert --deviate--.

<u>IN THE CLAIMS</u>

In claim 1, line 5, please delete "su" and substitute therefor --support--.

In claim 1, line 6, before "graduation" please insert --grid--.

In claim 1, line 8, before "first" please insert --said--.

In claim 1, line 21, before "partial" please insert --that--.

In claim 3, line 6, before "graduation" please insert --grid--.

UNITED STATES PATENT AND TRADEMARK OFFICE
CERTIFICATE OF CORRECTION

PATENT NO. : 4,988,864

DATED : January 29, 1991

INVENTOR(S) : Dieter Michel et al.

It is certified that error appears in the above-identified patent and that said Letters Patent is hereby corrected as shown below:

In claim 5, line 10, before "graduation" please insert --second--.

In claim 5, line 11, before "orders" please insert --adjacent--.

In claim 8, line 11, before "zone" please insert --graduation--.

In claim 8, line 14, before "beam" please insert --the--.

In claim 12, line 2, please delete "comprises" and substitute therefor --comprise--.

In claim 12, line 8, before "orders" please insert --adjacent--.

Signed and Sealed this

Third Day of September, 1991

*Attest:*

HARRY F. MANBECK, JR.

*Attesting Officer*     *Commissioner of Patents and Trademarks*